United States Patent
Yang et al.

(10) Patent No.: US 11,445,120 B2
(45) Date of Patent: Sep. 13, 2022

(54) INFORMATION PROCESSING METHOD FOR ADJUSTTING AN IMAGE CAPTURE REGION BASED ON SPOKEN UTTERANCE AND APPARATUS THEREFOR

(71) Applicant: LG ELECTRONICS INC., Seoul (KR)

(72) Inventors: In Jung Yang, Seoul (KR); Mi Seon Park, Seoul (KR); Ji-Won Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 284 days.

(21) Appl. No.: 16/787,905

(22) Filed: Feb. 11, 2020

(65) Prior Publication Data
US 2021/0168293 A1 Jun. 3, 2021

(30) Foreign Application Priority Data
Nov. 29, 2019 (KR) .......................... 10-2019-0157286

(51) Int. Cl.
| | |
|---|---|
| *H04N 5/232* | (2006.01) |
| *G10L 15/22* | (2006.01) |
| *G10L 15/19* | (2013.01) |
| *G10L 15/26* | (2006.01) |

(52) U.S. Cl.
CPC ......... *H04N 5/23299* (2018.08); *G10L 15/19* (2013.01); *G10L 15/22* (2013.01); *G10L 15/26* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 2001/0020837 | A1* | 9/2001 | Yamashita | G06N 3/008 318/567 |
| 2018/0046851 | A1* | 2/2018 | Kienzle | G06F 3/013 |
| 2018/0189354 | A1* | 7/2018 | Paine | G06F 3/167 |
| 2019/0317594 | A1* | 10/2019 | Stent | G05D 1/0221 |
| 2020/0043478 | A1* | 2/2020 | Lee | G10L 15/22 |
| 2020/0258515 | A1* | 8/2020 | Suzuki | G06F 3/14 |
| 2021/0392193 | A1* | 12/2021 | Kawano | G08B 25/00 |

* cited by examiner

*Primary Examiner* — Stella L. Woo
(74) *Attorney, Agent, or Firm* — Birch, Stewart, Kolasch & Birch, LLP

(57) ABSTRACT

Disclosed are an information processing method and information processing apparatus which execute an installed artificial intelligence (AI) algorithm and/or machine learning algorithm to process a spoken utterance of a user in a 5G communication environment. The information processing method according to an embodiment of the present disclosure may include receiving a spoken utterance of a user and extracting, from the spoken utterance, a demonstrative pronoun referring to a target indicated by the user, determining an image capture region to be scanned by a camera according to the type of the demonstrative pronoun, recognizing the target indicated by the user from a result of scanning the image capture region, and feeding back a result of processing the spoken utterance to the user on the basis of a result of recognizing the target indicated by the user.

18 Claims, 13 Drawing Sheets

INFORMATION PROCESSING METHOD FOR ADJUSTING AN IMAGE CAPTURE REGION BASED ON SPOKEN UTTERANCE AND APPARATUS THEREFOR

CROSS-REFERENCE TO RELATED APPLICATION

This present application claims the benefit of priority to Korean Patent Application No. 10-2019-0157286, entitled "INFORMATION PROCESSING METHOD AND APPARATUS THEREFOR," filed on Nov. 29, 2019, in the Korean Intellectual Property Office, the entire disclosure of which is incorporated herein by reference.

BACKGROUND

1. Technical Field

The present disclosure relates to an information processing method and information processing apparatus which adjust an image capture region to be preferentially scanned by a camera in order to process a spoken utterance of a user according to a demonstrative pronoun included in the spoken utterance, by executing an artificial intelligence (AI) algorithm and/or machine learning algorithm in a 5G communication environment.

2. Description of Related Art

Recently, various input methods for electronic devices have been proposed to facilitate interaction with users. For example, electronic devices may perform a speech input method for receiving speech data according to a user's utterance on the basis of execution of a specific application program. Furthermore, electronic devices may support a speech recognition service to derive a user's utterance intent by recognizing inputted speech data and performing a function corresponding to the intent.

In order to provide a service in response to a user's request, such electronic devices obtain a service request spoken utterance of a user and image information related to the service request, and analyze the obtained service request spoken utterance and image information to provide a service corresponding to the user's request.

Here, when obtaining the image information, a camera provided in an electronic device captures an image of a fixed region with a preset angle of view or output light in order to obtain the image information. Since an image capture region of the camera provided in the electronic device is limited to a fixed region, it is impossible to capture an image of a region wider than the fixed region or capture an image of an object located beyond the fixed region, and thus the service provided to a user may be restricted. Therefore, there is a need to develop technology for enabling an electronic device to adjust an image capture region of a camera according to the conditions.

The above-described background technology is technical information that the inventors hold for the derivation of the present disclosure or that the inventors acquired in the process of deriving the present disclosure. Thus, the above-described background technology may not necessarily be regarded as known technology disclosed to the general public prior to the filing of the present application.

SUMMARY OF THE INVENTION

An aspect of the present disclosure is to adjust an image capture region to be preferentially scanned by a camera in order to process a spoken utterance according to a spoken utterance of a user.

Another aspect of the present disclosure is to adjust an image capture region to be preferentially scanned by a camera according to a demonstrative pronoun included in a spoken utterance of a user.

Another aspect of the present disclosure is to adjust an angle of view at which a camera preferentially scans, according to a demonstrative pronoun included in a spoken utterance of a user.

Another aspect of the present disclosure is to adjust an intensity of output light outputted to an image capture region to be preferentially scanned by a camera according to a demonstrative pronoun included in a spoken utterance of a user.

An information processing method according to an embodiment of the present disclosure may include adjusting an image capture region to be preferentially scanned by a camera in order to process a spoken utterance of a user according to a demonstrative pronoun included in the spoken utterance of the user.

In detail, the information processing method according to an embodiment of the present disclosure may include receiving a spoken utterance of a user and extracting, from the spoken utterance, a demonstrative pronoun referring to a target indicated by the user, determining an image capture region to be scanned by a camera according to the type of the demonstrative pronoun, recognizing the target indicated by the user from a result of scanning the image capture region, and feeding back, to the user, a result of processing the spoken utterance on the basis of a result of recognizing the target indicated by the user.

According to the information processing method according to an embodiment of the present disclosure, an image capture region to be preferentially captured by a camera is adjusted according to a demonstrative pronoun included in a spoken utterance of a user, and thus a spoken utterance processing time may be reduced, processes for the spoken utterance processing may be reduced, and battery power consumption for the spoken utterance processing may be reduced.

An information processing apparatus according to another embodiment of the present disclosure may include an extraction processor, which receives a spoken utterance of a user and extracts, from the spoken utterance, a demonstrative pronoun referring to a target indicated by the user, a determination processor, which determines an image capture region to be scanned by a camera according to the type of the demonstrative pronoun, a recognition processor, which recognizes the target indicated by the user from a result of scanning the image capture region, and a feedback processor, which feeds back a result of processing the spoken utterance to the user on the basis of a result of recognizing the target indicated by the user.

Apart from those described above, another method and another system for implementing the present disclosure, and a computer-readable recording medium having a computer program stored therein to perform the method may be further provided.

Other aspects and features in addition as those described above will become clear from the accompanying drawings, claims, and the detailed description of the present disclosure.

According to embodiments of the present disclosure, an image capture region to be preferentially captured by a camera is adjusted according to a demonstrative pronoun included in a spoken utterance of a user, and thus a spoken utterance processing time can be reduced.

Furthermore, since an image capture region to be preferentially captured by a camera is adjusted according to a demonstrative pronoun included in a spoken utterance of a user, processes required for spoken utterance processing may be reduced.

Furthermore, since an image capture region to be preferentially captured by a camera is adjusted according to a demonstrative pronoun included in a spoken utterance of a user, battery power consumption for spoken utterance processing can be reduced.

The effects of the present disclosure are not limited to those mentioned above, and other effects not mentioned may be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
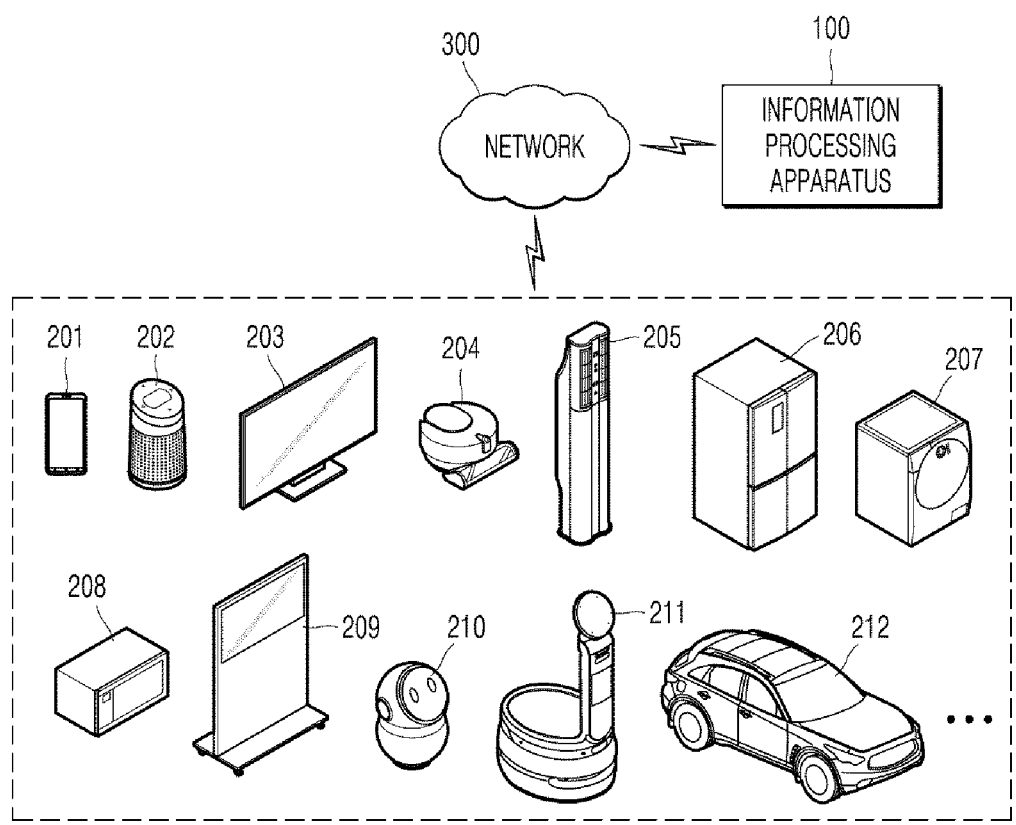
FIG. 1 is an exemplary diagram illustrating an information processing apparatus operation environment including an information processing apparatus according to an embodiment of the present disclosure, electronic devices, and a network for connecting the information processing apparatus and the electronic devices.

The advantages and features of the present disclosure and methods to achieve them will be apparent from the embodiments described below in detail in conjunction with the accompanying drawings. However, the description of particular exemplary embodiments is not intended to limit the present disclosure to the particular exemplary embodiments disclosed herein, but on the contrary, it should be understood that the present disclosure is to cover all modifications, equivalents and alternatives falling within the spirit and scope of the present disclosure. The embodiments disclosed below are provided so that this disclosure will be thorough and complete and will fully convey the scope of the present disclosure to those skilled in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will be omitted.

Figure 2:
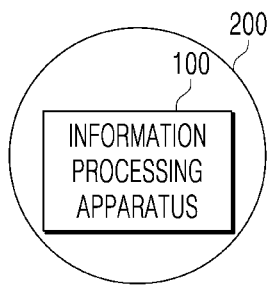
FIG. 2 is a diagram schematically illustrating an information processing apparatus provided in an electronic device according to an embodiment of the present disclosure.

FIG. 1 is an exemplary diagram illustrating an information processing apparatus operation environment including an information processing apparatus according to the present embodiment, electronic devices, and a network for connecting the information processing apparatus and the electronic devices. FIG. 2 is a diagram schematically illustrating an information processing apparatus provided in an electronic device according to the present embodiment. Referring to FIGS. 1 and 2, the information processing apparatus operation environment may include an information processing apparatus 100, an electronic device 200, and a network 300.

The information processing apparatus 100 may receive service request information from a user, and provide a service requested by the user. A method for the information processing apparatus 100 to receive the service request information from the user may include at least one of a case of receiving a touch signal for a display (141 of FIG. 3) from the user, a case of receiving a spoken utterance corresponding to a service request from the user, and/or a case of generating a captured image of a motion (for example, a gesture or the like for inducing the information processing apparatus 100 to approach) corresponding to the service request of the user.

Figure 4:
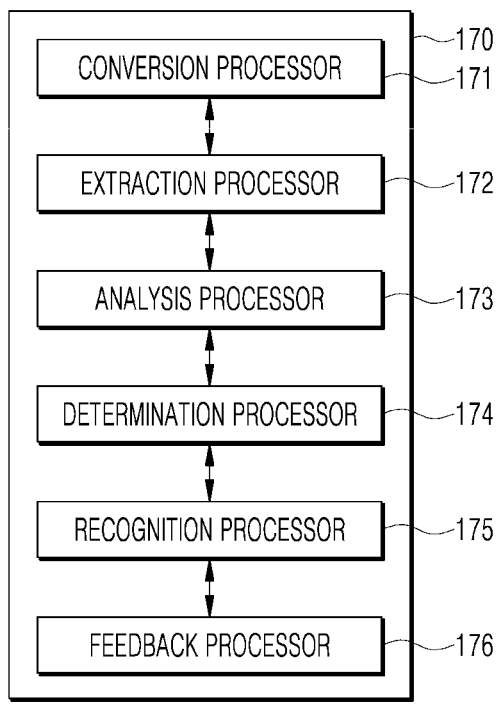
FIG. 4 is a schematic block diagram of the information processor in FIG. 3.

The information processing apparatus 100 that has received the service request information from the user may generate service response information corresponding thereto, and may feed back the service response information to the user via the display 141 and/or audio output interface (142 of FIG. 4).

Upon receiving the spoken utterance corresponding to the service request from the user, the information processing apparatus 100 may extract a demonstrative pronoun from the spoken utterance. Here, the demonstrative pronoun indicates a specific person, animal, location, or thing, and may include 'this (these)', 'that (those)', 'it', 'here', 'there', and the like. Furthermore, the pronoun 'this' (see FIG. 5A) among the pronouns may include a first demonstrative pronoun indicating a target near a speaker (for example, a user). Furthermore, the pronoun 'that' (see FIG. 5B) among the pronouns may include a second demonstrative pronoun indicating a target located far away from the speaker (for example, a user) or a listener (for example, the information processing apparatus 100). In the present embodiment, the demonstrative pronouns refer to a target indicated by the user, and may include, but are not limited to, one of the first demonstrative pronoun and the second demonstrative pronoun.

The information processing apparatus 100 may determine an image capture region to be scanned by a camera (121 of FIG. 2) provided in the information processing apparatus 100 according to the type of an extracted demonstrative pronoun. When the extracted demonstrative pronoun is the first demonstrative pronoun, the information processing apparatus 100 may determine a region between the user and the information processing apparatus 100 as the image capture region to be scanned by the camera 121.

When the extracted demonstrative pronoun is the second demonstrative pronoun, the information processing apparatus 100 may determine which region among regions located in a direction indicated by the user should be the image capture region to be scanned by the camera 121. For example, the information processing apparatus 100 may determine a region including the direction indicated by the user as the image capture region to be scanned by the camera 121. Alternatively, the information processing apparatus 100 may determine a periphery of a target included in the direction indicated by the user as the image capture region to be scanned by the camera 121.

Figure 7A:
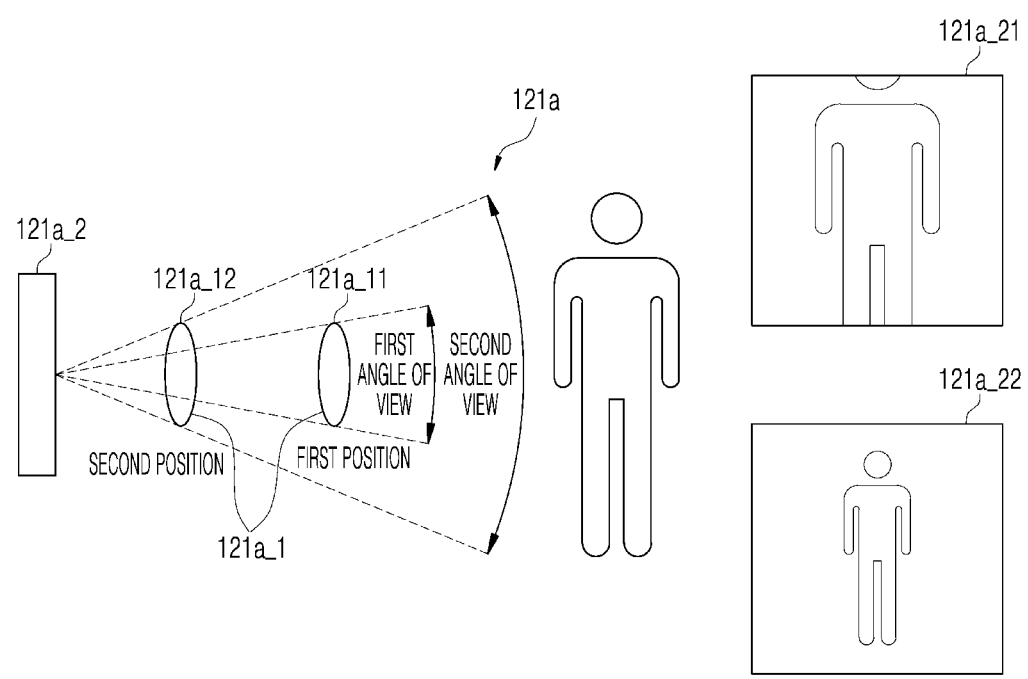
FIGS. 7A to 7C are exemplary diagrams illustrating determination by the determination processor of FIG. 4 of an image capture region to be scanned according to the type of a camera.
Figure 7B:
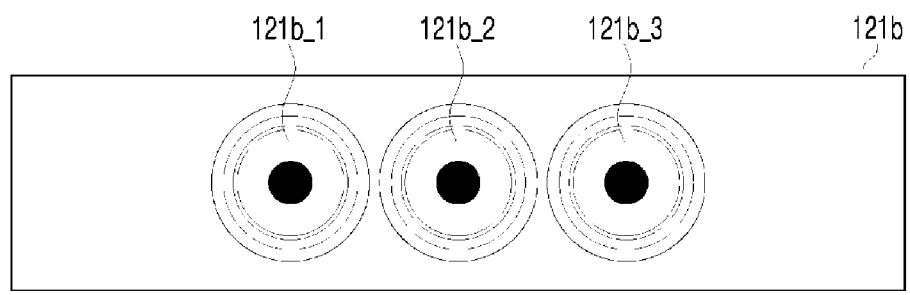
Figure 7C:
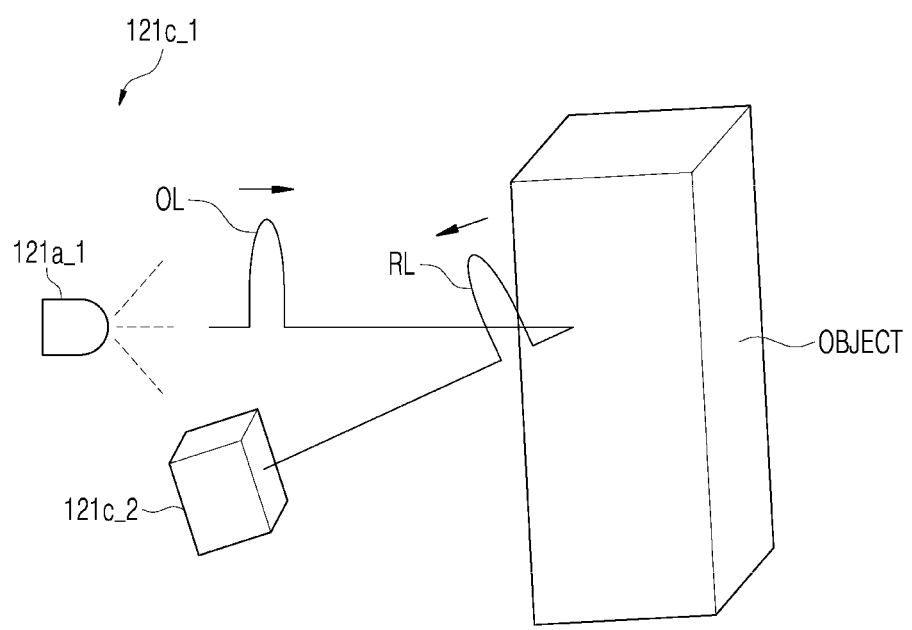

Furthermore, the information processing apparatus 100 may determine the image capture region to be scanned by the camera 121 according to the type of a demonstrative pronoun and the type of the camera 121 (121*a* of FIG. 7A, 121*b* of FIG. 7B, 121*c* of FIG. 7C).

After determining the image capture region to be scanned by the camera 121, the information processing apparatus 100 may recognize a target indicated by the user from a result of scanning the image capture region. The information processing apparatus 100 may recognize what the target indicated by the user is by extracting a feature point from the result of scanning the image capture region.

The information processing apparatus 100 may feed back a spoken utterance processing result to the user on the basis of a result of recognizing the target indicated by the user. When it is impossible to recognize the target indicated by the user from the result of scanning the image capture region, the information processing apparatus 100 may give an additional query (for example, asking what is indicated by a demonstrative pronoun) to the user, and then may process a spoken utterance, and feed back a spoken utterance processing result to the user.

The electronic device 200 may include various devices associated with the Internet of things, such as a user terminal 201, an artificial intelligence speaker 202 which serves as a hub for connecting other electronic devices to the network 400, home devices such as a TV 203, a robot cleaner 204, an air conditioner 205, a refrigerator 206, a washing machine 207, and a microwave oven 208, a signage 209 which is a display device installed in public or commercial spaces, a first communication robot 210 which communicates with a user in an emotional manner such as a gaze, expression of emotion, physical contact, and the like, a second communication robot 211 which performs services such as patrolling, guiding, cleaning, prevention of epidemics, transport, and the like in public places (for example, air ports, hospitals, and companies), and a vehicle 212. However, the electronic device 200 is not limited to the examples illustrated in FIG. 1. In the present embodiment, the information processing apparatus 100 may be provided in the electronic device 200 as illustrated in FIG. 2 so that the electronic device 200 may operate like the information processing apparatus 100.

The user terminal 201, among such electronic devices 200, may receive a service for driving or controlling the information processing apparatus 100 through an authentication process after accessing an information processing apparatus driving application or information processing apparatus driving site. In the present embodiment, the user terminal 201 that has completed the authentication process may drive the information processing apparatus 100 and control the operation of the information processing apparatus 100.

In the present embodiment, the user terminal 201 may be a desktop computer, smartphone, notebook, tablet PC, smart TV, mobile phone, personal digital assistant (PDA), laptop, media player, micro-server, global positioning system (GPS) device, electronic book terminal, digital broadcasting terminal, navigation, kiosk, MP4 player, digital camera, home appliance, and other mobile or immobile computing devices which are operated by an user, but is not limited thereto. In addition, the user terminal 201 may be a wearable terminal having a communication function and a data processing function, such as a watch, glasses, a hair band, and a ring. The user terminal 201 is not limited thereto. Any terminal that is capable of performing web browsing may be used without limitation.

The network 300 may serve to connect the information processing apparatus 100 and the electronic device 200. The network 300 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 300 may send and receive information by using short distance communication and/or long distance communication. The short distance communication may include Bluetooth®, radio frequency identification (RFID), infrared data association (IrDA), ultra-wideband (UWB), ZigBee, and wireless fidelity (Wi-Fi) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 300 may include a connection of network elements such as hubs, bridges, routers, and switches. The network 300 may include one or more connected networks, including a public network such as the Internet and a private network such as a secure corporate private network. For example, the network may include a multi-network environment. The access to the network 300 may be provided via one or more wired or wireless access networks. Further, the network 300 may support 5G communication and/or an Internet of things (IoT) network for exchanging and processing information between distributed components such as objects.

Figure 3:
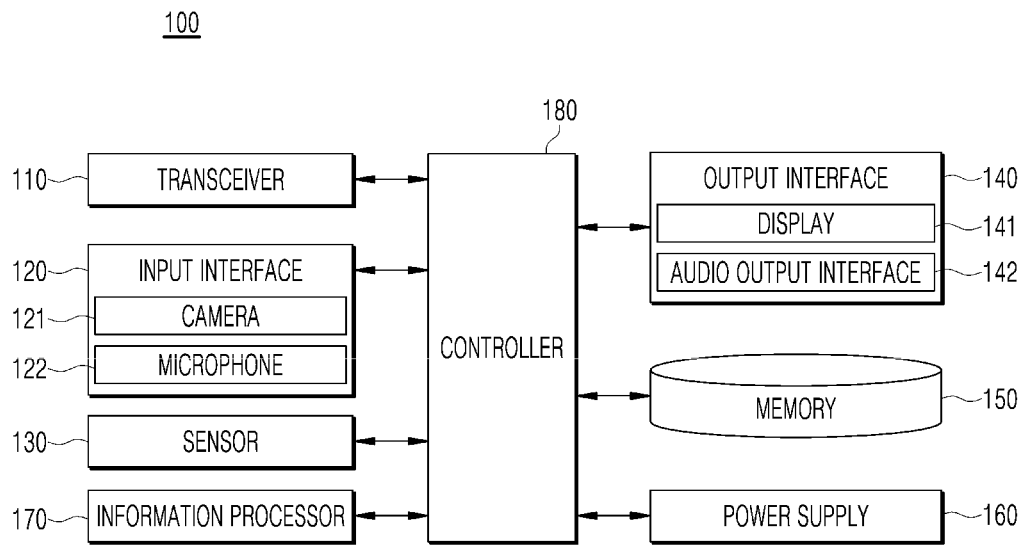
FIG. 3 is a schematic block diagram illustrating the information processing apparatus of FIGS. 1 and 2.

FIG. 3 is a schematic block diagram illustrating the information processing apparatus of FIGS. 1 and 2. Hereinafter, description overlapping with that of FIGS. 1 and 2 will be omitted. Referring to FIG. 3, the information processing apparatus 100 may include a transceiver 110, an input interface 120, a sensor 130, an output interface 140, a memory 150, a power supply 160, an information processor 170, and a controller 180.

The transceiver 110 may interwork with the network 300 to provide a communication interface required for providing, in the form of packet data, transmission/reception signals between the information processing apparatus 100 and the electronic device 200. Furthermore, the transceiver 110 may support a variety of object-to-object intelligent communications, for example, Internet of things (IoT), Internet of everything (IoE), and Internet of small things (IoST), and may support, for example, machine to machine (M2M) communication, vehicle to everything (V2X) communication, and device to device (D2D) communication.

The input interface 120 may include a camera 121 for receiving input of image signals and a microphone 122 for receiving input of audio signals. Under control of the controller 180, the camera 121 may photograph an image of the surroundings of the information processing apparatus 100 according to an operation mode and/or operation state of the information processing apparatus 100. In order to increase efficiency of the photographing, a plurality of cameras 121 may also be provided.

The camera 121 may include at least one among first to third cameras 121a to 121c. The first camera 121a (FIG. 7A) may include: an image sensor (for example, a CMOS image sensor, 121a_2 of FIG. 7A) including at least one optical lens (121a_1 of FIG. 7A) and a plurality of photodiodes (for example, pixels) for forming an image by light that has passed through the optical lens; and a digital signal processor (DSP) (not shown) for composing an image on the basis of signals output from the photodiodes. The second camera may include a triple camera (121b of FIG. 7B) including a wide-angle lens (121b_1 of FIG. 7B), a normal lens (121b_2 of FIG. 7B), and a telescopic lens (121b_3 of FIG. 7B). The third camera may include a time-of-flight (TOF) camera (121c of FIG. 7C) including a light source 121c_1 and a detector 121c_2. In addition, an RGB-D camera (not shown) may be further included as a fourth camera.

The camera 121 can generate still images and also a moving image including frames composed of the still images. Further, the images photographed and acquired by the camera 121 may be stored in the memory 150.

In the present embodiment, the information processing apparatus 100 may further include an image processor (not shown) which analyzes and processes an image captured by the camera 121. The image processor may be provided inside or outside the camera 121. The image processor 121 may reduce noise for a photographed image frame photographed by the camera 121 and may perform image signal processing operations for image quality improvement, such as gamma correction, color filter array interpolation, color matrix, color correction, and color enhancement. Further, the image processor may perform functions such as a coloring process, a blurring process, an edge emphasizing process, an image analysis process, an image recognition, and an image effect process. Facial recognition, scene recognition, motion recognition, and the like may be performed for the image recognition. For example, brightness level adjustment, color correction, contrast adjustment, contour enhancement adjustment, screen division processing, character image generation, and image synthesis processing may be performed.

In response to control by the controller 180, a microphone 122 may receive input of a spoken utterance of the user towards the information processing apparatus 100. In order to more accurately receive the spoken utterance of the user, a plurality of the microphones 122 may also be used. Here, the plurality of microphones may be disposed to be spaced apart from each other in different positions and process the received spoken utterance of the user as an electrical signal. Here, the input interface 120 may use various noise removal algorithms to remove noise generated in the process of receiving the user voice signal. In an alternative example of the present disclosure, the input interface 120 may include various constituent elements for processing spoken utterances of the user, such as a noise removal filter (not shown) for removing noise from the received spoken utterance and an amplifier (not shown) for amplifying an output signal of the noise removal filter and outputting the amplified signal.

In an alternative example of the present disclosure, the input interface 120 may include a user input interface (not shown) (for example a touch-type key or a push-type mechanical key) for receiving information from the user, used in relation to setting of the driving mode.

For example, the input interface 120 may include first to fourth contact switches (not shown). A program pre-stored in the memory 150 may determine how output signals of the respective contact switches are to be processed. For example, left-directional menus displayable in the left direction on the display 141 or right-directional menus displayable in the right direction on the display 141 may be selected according to an operation signal of the first contact switch or an operation signal of the second contact switch. In addition, upward menus displayable in the upward direction on the display 141 or downward menus displayable in the downward direction on the display 141 may be selected according to an operation signal of the third contact switch or an operation signal of the fourth contact switch. Further, when one of the first to fourth contact switches is operated, the speech recognition function may be activated.

The sensor 130 may include at least one sensor for sensing at least one of information in the information processing apparatus 100, information about a surrounding environment of the information processing apparatus 100, or user information. For example, the sensor 130 may include at least one among an obstacle detection sensor (for example, a proximity sensor or a Light Detection And Ranging (lidar) sensor), a weight detection sensor, an illumination sensor, a touch sensor, an acceleration sensor, a magnetic sensor, a gravity sensor (G-sensor), a gyroscope sensor, a motion sensor, an RGB sensor, an infrared (IR) sensor, a fingerprint recognition sensor, an ultrasonic sensor, an optical sensor (for example, the camera 121), a microphone (for example, the microphone 122), a battery gauge, an environmental sensor (for example, a barometer, a hygrometer, a thermometer, a radioactivity detection sensor, a heat detection sensor, or a gas detection sensor), and a chemical sensor (for example, an electronic nose, a healthcare sensor, or a biometric sensor). In the present embodiment, the information processing apparatus 100 may combine various information sensed by at least two of the above-mentioned sensors, and use the combined information.

The output interface 140 may output information related to operations of the information processing apparatus 100 as, for example, visual data, auditory data, and tactile sensation data. The output interface 140 may include a display 141, an audio output interface 142, and a haptic output interface (not shown).

The display 141 may output information related to an operation of the information processing apparatus 100 as visual data. The display 141 may form a mutual layer structure with a touch sensor, or may be formed integrally with the touch sensor, and may thereby be implemented as a touchscreen. The touch screen may provide an output interface between the information processing apparatus 100 and a user, while also providing an input interface between the information processing apparatus 100 and the user.

The audio output interface 142 may output information related to the operation of the information processing apparatus 100 as audio data, and may audibly output various notification messages (such as a warning sound, and a sound indicating, for example, an operation mode, an operation state, an error state), information corresponding to a voice command of the user, and the result of processing the voice command of the user. The audio output interface 142 may convert an electrical signal received from the controller 180 into an audio signal. For this purpose, the audio output interface 142 may include, for example, a speaker (not shown).

The memory 150 may store data supporting various functions of the information processing apparatus 100. The memory 150 may store a plurality of application programs or applications that are driven by the information processing apparatus 100, data for operating the information processing apparatus 100, and instructions. At least some of these application programs may be downloaded from an external server via wireless communication.

The memory 150 stores a wake-up word that may drive the information processing apparatus 100, and the information processor 170 may recognize when the user utters the wake-up word, and change the information processing apparatus 100 from an inactive state to an active state. Furthermore, the memory 150 may store information about a task to be performed by the information processing apparatus 100 in response to a voice command (for example, a spoken utterance that calls the information processing apparatus 100) of the user.

Furthermore, the memory 150 may store instructions to be executed by the information processor 170, for example, an instruction for receiving a spoken utterance of the user, an instruction for extracting, from the spoken utterance, a demonstrative pronoun referring to a target indicated by the user, an instruction for determining an image capture region to be scanned by the camera 121 according to the type of the demonstrative pronoun, an instruction for recognizing the target indicated by the user from a result of scanning the image capture region, and an instruction for feeding back a spoken utterance processing result to the user on the basis of a result of recognizing the target indicated by the user.

In the present embodiment, the memory 150 may serve to temporarily or permanently store data processed by the controller 180. Here, the memory 150 may include a magnetic storage media or a flash storage media. However, the present disclosure is not limited thereto. The memory 150 may include an internal memory and/or an external memory and may include a volatile memory such as a DRAM, a SRAM or a SDRAM, and a non-volatile memory such as one-time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

The power supply 160 may be applied with external power or internal power under the control of the controller 180 to supply power to each component of the information processing apparatus 100. The power supply 160 may include a battery. The battery may be implemented as an embedded battery or a replaceable battery. The battery may be charged by a wired or wireless charging method and the wireless charging method may include a magnetic induction method or a self-resonance method. In the present embodiment, the battery may include a rechargeable secondary battery, for example, a nickel-cadmium battery, a lead battery, a nickel metal hydride (NiMH) battery, a lithium-ion battery, and a lithium polymer battery, but is not limited thereto.

In the present embodiment, the controller 180 may control charging or discharging of the battery, and may protect the battery by monitoring state information of the battery. For example, the controller 180 may perform various functions of the battery, for example, an overcharge protection function, an overdischarge protection function, an overcurrent protection function, an overvoltage protection function, an overheating protection function, and a cell balancing function of the battery. In addition, the controller 180 may acquire a current of the battery, a voltage of the battery, a temperature of the battery, a remaining power amount of the battery, a battery lifespan, and a state of charge (SOC) of the battery. For example, although not shown in the drawings, the controller 180 may measure a voltage and temperature of the battery using the sensor 130. If the sensor 130 detects the presence of an abnormal situation such as, for example, overcharging, overdischarging, overcurrent, or a high temperature in the battery, the controller 180 may protect the battery by controlling charging or discharging of the battery.

The information processor 170 may receive a spoken utterance of the user, and may extract, from the spoken utterance, a demonstrative pronoun referring to a target indicated by the user. The information processor 170 may determine an image capture region to be scanned by the camera 121 according to the type of the demonstrative pronoun. The information processor 170 may recognize the target indicated by the user from the result of scanning the image capture region. The information processor 170 may feed back a spoken utterance processing result to the user on the basis of the result of recognizing the target indicated by the user.

In the present embodiment, the information processor 170 may be provided outside the controller 180 as illustrated in FIG. 3, or may be provided inside the controller 180 and operate like the controller 180. Hereinafter, the details of the information processor 170 will be described with reference to FIGS. 4 to 6.

The controller 180 may control the overall operation of the information processing device 100 by operating control software installed in the memory 150 as a kind of central processing device.

Here, the controller 180 may include a device of any kind capable of processing data, such as a processor. Here, "processor" may, for example, refer to a data processing device embedded in hardware, which has a physically structured circuitry to perform a function represented by codes or instructions contained in a program. As examples of the data processing device embedded in hardware, a microprocessor, a central processor (CPU), a processor core, a multiprocessor, an application-specific integrated circuit (ASIC), and a field programmable gate array (FPGA) may be included, but the scope of the present disclosure is not limited thereto.

In the present embodiment, the controller 180 may execute an artificial intelligence (AI) algorithm and/or machine learning algorithm so that the information processing apparatus 100 may output an optimal information processing result.

Artificial intelligence (AI) is an area of computer engineering science and information technology that studies methods to make computers mimic intelligent human behaviors such as reasoning, learning, and self-improving.

In addition, AI does not exist on its own, but is rather directly or indirectly related to a number of other fields in computer science. Particularly in recent years, there have been numerous attempts to introduce an element of AI into various fields of information technology to solve problems of the respective fields.

Machine learning is an area of artificial intelligence that includes the field of study that gives computers the capability to learn without being explicitly programmed. Specifically, machine learning can be a technology for researching and constructing a system for learning, predicting, and improving its own performance based on empirical data and an algorithm for the same. Machine learning algorithms, rather than only executing rigidly-set static program commands, may be used to take an approach that builds models for deriving predictions and decisions from inputted data.

In the present embodiment, the controller 180 may perform machine learning, such as deep learning, on at least one of a speech or image information, and the memory 150 may store, for example, data used in the machine learning and result data.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN). For example, the deep learning structure may include a deep neural network (DNN), such as a convolutional neural network (CNN), a recurrent neural network (RNN), and a deep belief network (DBN). The deep learning structure according to the present embodiment may use various structures well known in the art. For example, the deep learning structure according to the present disclosure may include a CNN, a RNN, and a DBN. RNN is widely used in natural language processing and may configure an artificial neural network structure by building up layers at each instant in a structure that is effective for processing time-series data which vary with time. A DBN may include a deep learning structure formed by stacking up multiple layers of restricted Boltzmann machines (RBM), which is a deep learning scheme. When a predetermined number of layers are constructed by repetition of RBM learning, the DBN having the predetermined number of layers may be constructed. A CNN may include a model mimicking a human brain function, which is built under the assumption that when a person recognizes an object, the brain extracts the most basic features of the object and recognizes the object based on the result of complex calculations in the brain.

Further, the artificial neural network may be trained by adjusting weights of connections between nodes (if necessary, adjusting bias values as well) so as to produce a desired output from a given input. Furthermore, the artificial neural network may continuously update the weight values through training. Furthermore, a method of back propagation, for example, may be used in the learning of the artificial neural network.

Meanwhile, the controller 180 may be equipped with an artificial neural network, and may generate a sentence on the basis of machine learning using at least one of an acquired spoken utterance or image information as input data.

The controller 180 may include an artificial neural network, for example, a deep neural network (DNN) and train the DNN, and examples of the DNN include CNN, RNN, DBN, and so forth. As a machine learning method for such an artificial neural network, both unsupervised learning and supervised learning may be used. The controller 180 may perform control so as to update an artificial neural network structure after learning according to a setting.

FIG. 4 is a schematic block diagram of the information processor in FIG. 3. Hereinbelow, description overlapping with that of FIGS. 1 to 3 will be omitted. Referring to FIG. 4, the information processor 170 may include a conversion processor 171, an extraction processor 172, an analysis processor 173, a determination processor 174, a recognition processor 175, and a feedback processor 176. In an alternative embodiment, the conversion processor 171 to the feedback processor 176 may correspond to one or more processors. In an alternative embodiment, the conversion processor 171 to the feedback processor 176 may correspond to software components configured to be executed by one or more processors.

The conversion processor 171 may receive a spoken utterance of the user and may convert the spoken utterance into text. The conversion processor 171 may use a speech-to-text (STT) algorithm to convert the spoken utterance of the user into text. The conversion processor 171 may remove a noise signal from the spoken utterance of the user, and may extract a predetermined feature vector (vector). Here, the predetermined feature vector may include linear predictive coefficients (LPCs) cepstrum, perceptual linear prediction (PLC) cepstrum, mel frequency cepstral coefficients (MFCCs), filter bank energy, and the like. The conversion processor 171 may search for a most similar word by referring to a dictionary including a recognition target vocabulary obtained in advance during a learning process so as to convert the extracted feature vector into a most similar word text.

In an alternative embodiment, the conversion processor 171 may generate a sentence by analyzing a result of converting the spoken utterance of the user into text. The conversion processor 171 may analyze, on the basis of a morpheme dictionary, the result of converting the spoken utterance of the user into a text on a morpheme-by-morpheme basis, and may tag a morpheme unit with a word class. Here, the morpheme unit includes a common noun/ NNG, a nominative case marker/JKS, an adjective/VA, a final ending/EF, a period, a question mark, an exclamation point/SF, and the like. For example, if the result of converting the spoken utterance into text reads, in Korean, "Oneul nalssiga eottae", the text may be analyzed into morpheme units such as 'oneul/NNG+nalssi/NNG+ga/JKS+eottoh/ VA+eo/EF+/SF', which may be tagged with word classes. The above morpheme analysis is merely an example, and the present disclosure is not limited thereto.

The conversion processor 171 may generate a sentence after analyzing phrases of morphemes tagged with word classes on the basis of a predefined rule and dictionary. Here, the phrases may represent agglomerates achieved by analyzing, into morpheme units, the result of converting the spoken utterance of the user into a text, tagging the morpheme units with word classes, and grouping the morpheme units into larger units such as noun phrases, verb phrases, adjective phrases, and the like. The conversion processor 171 may analyze phrases of the result of converting the spoken utterance into a text on the basis of a dictionary, such as a system dictionary, a user dictionary, a stopword dictionary, and the like, and a predefined rule stored in the memory 150. For example, the conversion processor 171 may analyze the phrases of the result of converting the spoken utterance into a text into 'oneul/NNG', 'nalssi/NNG+ga/JKS', 'eottoh/VA+eo/EF+/SF'. The above phrase analysis is merely an example, and the present disclosure is not limited thereto.

The extraction processor 172 may extract a demonstrative pronoun referring to a target indicated by the user from the result of converting the spoken utterance of the user into a text or the result of generating a sentence for the result of converting the spoken utterance of the user into a text. The extraction processor 172 may compare demonstrative pronouns included in the result of converting the spoken utterance of the user into a text or the result of generating a sentence for the result of converting the spoken utterance of the user into a text with reference demonstrative pronouns stored in the memory 150 so as to extract a matching demonstrative pronoun.

The extraction processor 172 may extract the first demonstrative pronoun indicating a target near a speaker (for example, a user) and the second demonstrative pronoun indicating a target located far away from the speaker (for example, a user) or a listener (for example, the information processing apparatus 100). In the present embodiment, demonstrative pronouns are not limited to the first demonstrative pronoun and the second demonstrative pronoun, and thus, in addition to the first demonstrative pronoun and the second demonstrative pronoun, other demonstrative pronouns referring to a target indicated by the user may be extracted.

Upon receiving a spoken utterance, the analysis processor 173 may obtain image information including a gesture of the user to identify a direction indicated by the user. The analysis processor 173 may obtain skeleton information about the user from the image information including the gesture of the user, and may identify a direction indicated by a controlling entity using a position of shoulder joints and a position of knuckles of the user from the skeleton information.

The analysis processor 173 may further include a skeleton analyzer (not shown) to obtain the skeleton information. The skeleton analyzer may recognize positions and orientations of at least both shoulders, both elbows, both wrists, both hips, both knees, and both ankles using angles of joints and distances between joints on the basis of a human body shape analysis.

In an alternative embodiment, the analysis processor 173 may output a direction indicated by the user as an object included in the image information using a deep neural network model trained in advance to identify an indicated direction by analyzing a gesture of an object. A process of training the deep neural network model may be performed through supervised learning, and this learning may be performed through data obtained by labelling gesture information extracted from a larger number of objects with directions indicated by gesture information included in an image.

The determination processor 174 may determine an image capture region to be scanned by the camera 121 provided in the information processing apparatus 100 according to at least one of the type of a demonstrative pronoun or a result of identifying the direction indicated by the user.

When the type of the extracted demonstrative pronoun is the first demonstrative pronoun, the determination processor 174 may determine a region (101 of FIG. 6) between the user and the information processing apparatus 100 as the image capture region to be scanned by the camera 121. Here, a method of determining the image capture region to be scanned may vary according to the type of the camera 121, and relevant detailed description will be provided with reference to FIG. 5.

When the type of the extracted demonstrative pronoun is the second demonstrative pronoun, the determination processor 174 may determine which region among regions located in a direction indicated by the user should be the image capture region to be scanned by the camera 121. In the present embodiment, the determination processor 174 may determine a region (102 of FIG. 6) including the direction indicated by the user as the image capture region to be scanned by the camera 121. Alternatively, the determination processor 174 may determine a periphery of a target included in the direction indicated by the user as the image capture region to be scanned by the camera 121. Here, a method of determining the image capture region to be scanned may vary according to the type of the camera 121, and relevant detailed description will be provided with reference to FIG. 5.

After the image capture region to be scanned by the camera 121 is determined, the recognition processor 175 may recognize a target indicated by the user from a result of scanning the image capture region. The recognition processor 175 may recognize what the target indicated by the user is by extracting a feature point from the result of scanning the image capture region.

The recognition processor 175 may extract a feature point from the result of scanning the image capture region. Unlike text data, the result of scanning the image capture region, that is, image data, is not in an immediately analyzable state, and thus a feature point may be required to be preferentially extracted. For example, when distinguishing a circle and a polygon, feature points which represent apexes are used so that when an object has three apexes, the object is determined as a triangle and when there is no apex, the object is determined as a circle. In addition to the apexes, the feature points may be extracted to catch various patterns. The feature points are achieved by catching points that rapidly change in image data.

The recognition processor 175 may use various methods to extract feature points from the result of scanning the image capture region. For example, scale-invariant feature transform (SIFT) or speeded-up robust features (SURF) may be used.

SIFT is an algorithm for extracting feature points regardless of the result of scanning the image capture region, that is, regardless of an image size. For example, when a feature point representing an apex is used, the size which forms an apex may vary depending on the image size. In this case an apex can be extracted from an image with a specific size, but a problem may arise wherein an apex cannot be extracted from an image which is relatively large or relatively small. SIFT is an algorithm which solves the above-described problem, and is able to extract a feature point of a specific pattern regardless of the image size. SURF is an algorithm which finds a feature point of the image quicker than SIFT.

Like SIFT, SURF finds feature points regardless of the image size, but is superior in terms of speed. SURF may be used to analyze a large image or video file. Although SIFT and SURF have been described as algorithms which extract a feature point for one or more objects from an image, SIFT and SURF are merely illustrative, and various methods may be used.

The recognition processor 175 may recognize the type of the target indicated by the user on the basis of extracted feature points. The recognition processor 175 may recognize an object using various methods, and may use algorithms such as support vector machine (SVM) and neural networks (NN) to recognize the type of a target indicated by the user. Recognizing the type of a target indicated by the user may represent, for example, detecting a name of the target and/or detecting which type of an object the target is.

Here, the SVM is an algorithm which finds a hyperplane which satisfactorily distinguishes given data and uses only a support vector located at a boundary between different classes of data. The NN is an algorithm which learns a weight so as to maximize a likelihood, defined through an energy, and minimize errors, and can learn all the weight matrixes between layers using all the data. In this case, when the algorithm for recognizing the type of object is executed, a supervised method, an unsupervised method, and a semi-supervised method may be applied.

The feedback processor 176 may feed back a spoken utterance processing result to the user on the basis of a result of recognizing the target indicated by the user. In order to feed the spoken utterance processing result back to the user, the feedback processor 176 may execute a natural language understanding process, a dialogue manager process, a natural language generation process, and a text-to-speech conversion process.

However, when it is impossible to recognize the target indicated by the user from the result of scanning the image capture region, the feedback processor 176 may give an additional query (for example, asking what is indicated by a demonstrative pronoun) to the user, and then may process a spoken utterance, and may feed back a spoken utterance processing result to the user. Here, the case in which the target indicated by the user is not included in the result of scanning the image capture region may include the case in which the image capture region of the camera 121 has been erroneously set or the case in which the target indicated by the user is located beyond the image capture region of the camera 121.

Figure 5A:
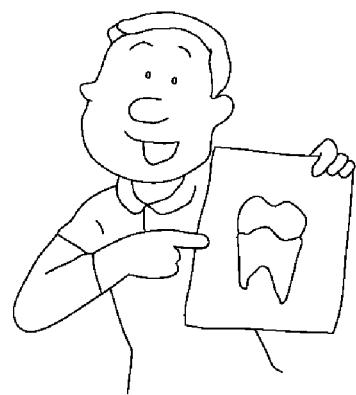
FIGS. 5A and 5B are exemplary diagrams for schematically describing demonstrative pronouns according to an embodiment of the present disclosure.
Figure 5B:
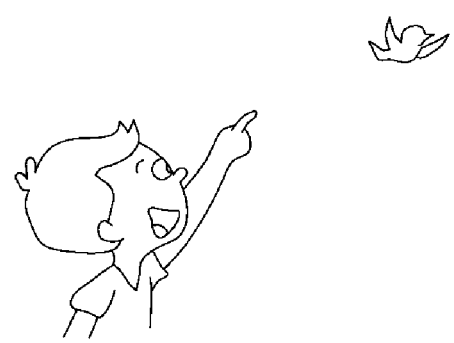

FIGS. 5A and 5B are exemplary diagrams for schematically describing demonstrative pronouns according to the present embodiment. Hereinafter, description overlapping with that of FIGS. 1 to 4 will be omitted.

In the present embodiment, the demonstrative pronouns may indicate a specific person, animal, location, or thing, and may include 'this (these)', 'that (those)', 'it', 'here', 'there', and the like.

Referring to FIG. 5A, the first demonstrative pronoun, which is one type of the demonstrative pronouns, may include the pronoun 'this' as a demonstrative pronoun indicating a target near a speaker (for example, a user). FIG. 5A illustrates a first spoken utterance situation of a user, in which the user is holding a picture and describing a target included in the picture by using the first demonstrative pronoun.

Referring to FIG. 5B, the second demonstrative pronoun may include the pronoun 'that' as a demonstrative pronoun indicating a target located far away from a speaker (for example, a user) or a listener (for example, the information processing apparatus 100). FIG. 5B illustrates a second spoken utterance situation of a user, in which the user is making an utterance while indicating a target by using the second demonstrative pronoun.

Figure 6:
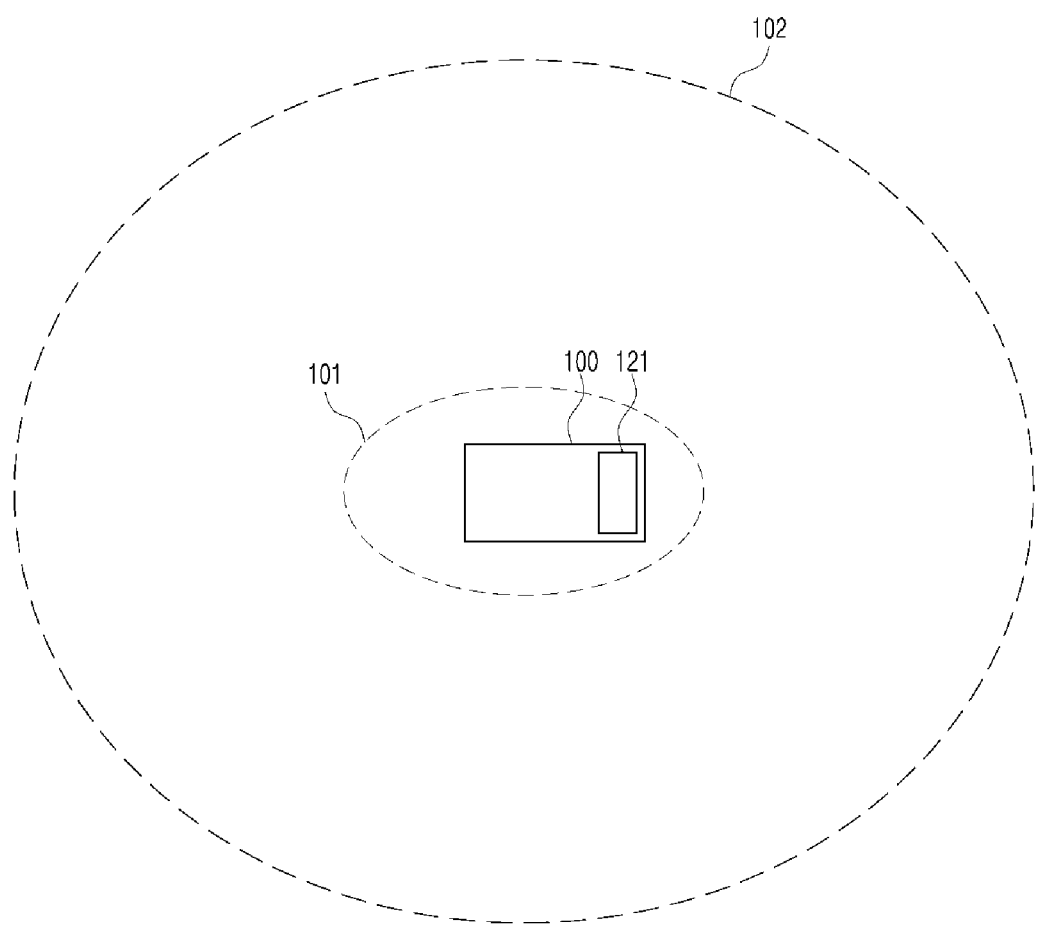
FIG. 6 is an exemplary diagram illustrating an image capture region to be scanned by an information processing apparatus according to an embodiment of the present disclosure.

FIG. 6 is an exemplary diagram illustrating an image capture region to be scanned by an information processing apparatus according to the present embodiment. Hereinafter, description overlapping with that of FIGS. 1 to 4 will be omitted.

Referring to FIG. 6, when the first demonstrative pronoun is included in a spoken utterance of the user, the information processing apparatus 100 may determine a region 101 between the user and the information processing apparatus 100 as the image capture region to be scanned.

Furthermore, when the second demonstrative pronoun is included in the spoken utterance of the user after obtaining the spoken utterance of the user and obtaining, by using the camera 121, image information including a gesture of the user, the information processing apparatus 100 may determine which region among regions located in a direction indicated by the user should be the image capture region to be scanned. The information processing apparatus 100 may determine an arbitrary region 102 including the direction indicated by user as the image capture region to be scanned by the camera 121. Alternatively, the information processing apparatus 100 may determine a periphery of a target included in the direction indicated by the user as the image capture region to be scanned by the camera 121.

FIGS. 7A to 7C are exemplary diagrams illustrating determination by the determination processor of FIG. 4 of an image capture region to be scanned according to the type of a camera. Hereinafter, description overlapping with that of FIGS. 1 to 6 will be omitted.

Referring to FIG. 7A, a first camera 121*a* may include at least one optical lens 121*a*_1 and an image sensor 121*a*_2. Here, the optical lens 121*a*_1 may move along an optical axis in a normal direction perpendicular to an upper surface of the image sensor 121*a*_2.

When the type of an extracted demonstrative pronoun is the first demonstrative pronoun, the determination processor 174 may move the optical lens 121*a*_1 to a first position 121*a*_11 to determine the image capture region to be scanned by the camera 121*a* so that an image of a region between the user and the image processing apparatus 100, that is, a first-angle-of-view image 121*a*_21, is outputted to the image sensor 121*a*_2.

When the type of the extracted demonstrative pronoun is the second demonstrative pronoun, the determination processor 174 may move the optical lens 121*a*_1 to a second position 121*a*_12 to determine the image capture region to be scanned by the camera 121*a* so that an image of an arbitrary region including the direction indicated by the user, that is, a second-angle-of-view image 121*a*_22, is outputted to the image sensor 121*a*_2. Here, the second angle of view may be larger than the first angle of view. The second-angle-of-view image 121*a*_22 may include a larger area of an image than that of the first-angle-of-view image 121*a*_21.

Referring to FIG. 7B, the second camera 121*b* may include a triple camera including a wide-angle lens 121*b*_1, a normal lens 121*b*_2, and a telescopic lens 121*b*_3. The wide-angle lens 121*b*_1 may scan a wider image capture region than the normal lens 121*b*_2. The telescopic lens 121*b*_3 may scan a more distant image capture region than the normal lens 121*b*_2.

When the type of the extracted demonstrative pronoun is the first demonstrative pronoun, the determination processor 174 may select a wide-angle lens (121*b*_1 of FIG. 7B) to determine a region between the user and the information processing apparatus 100 as the image capture region to be scanned by the second camera 121b.

When the type of the extracted demonstrative pronoun is the second demonstrative pronoun, the determination processor 174 may select a telescopic lens (121b_3 of FIG. 7B) to determine an arbitrary region including the direction indicated by the user as the image capture region to be scanned by the second camera 121b.

Referring to FIG. 7C, the third camera 121c may include a time-of-flight (TOF) camera including the light source 121c_1 and the detector 121c_2. When the light source 121c_1 outputs output light or output pulse OL at a time point t1, the output light or output pulse is reflected from a target, and reflected light or reflected pulse RL may be detected by the detector 121c_2 at a time point t2. Accordingly, the third camera 121c may calculate a distance to the target using a time difference t2−t1 between the time point t1 and the time point t2.

When the type of the extracted demonstrative pronoun is the first demonstrative pronoun, the determination processor 174 may decrease an intensity of the output light outputted from the light source 121c_1 to a value lower than a reference value to determine a region between the user and the information processing apparatus 100 as the image capture region to be scanned by the third camera 121c.

When the type of the extracted demonstrative pronoun is the second demonstrative pronoun, the determination processor 174 may increase the intensity of the output light outputted from the light source 121c_1 to a value higher than the reference value to determine an arbitrary region including the direction indicated by the user as the image capture region to be scanned by the third camera 121c.

Figure 8A:
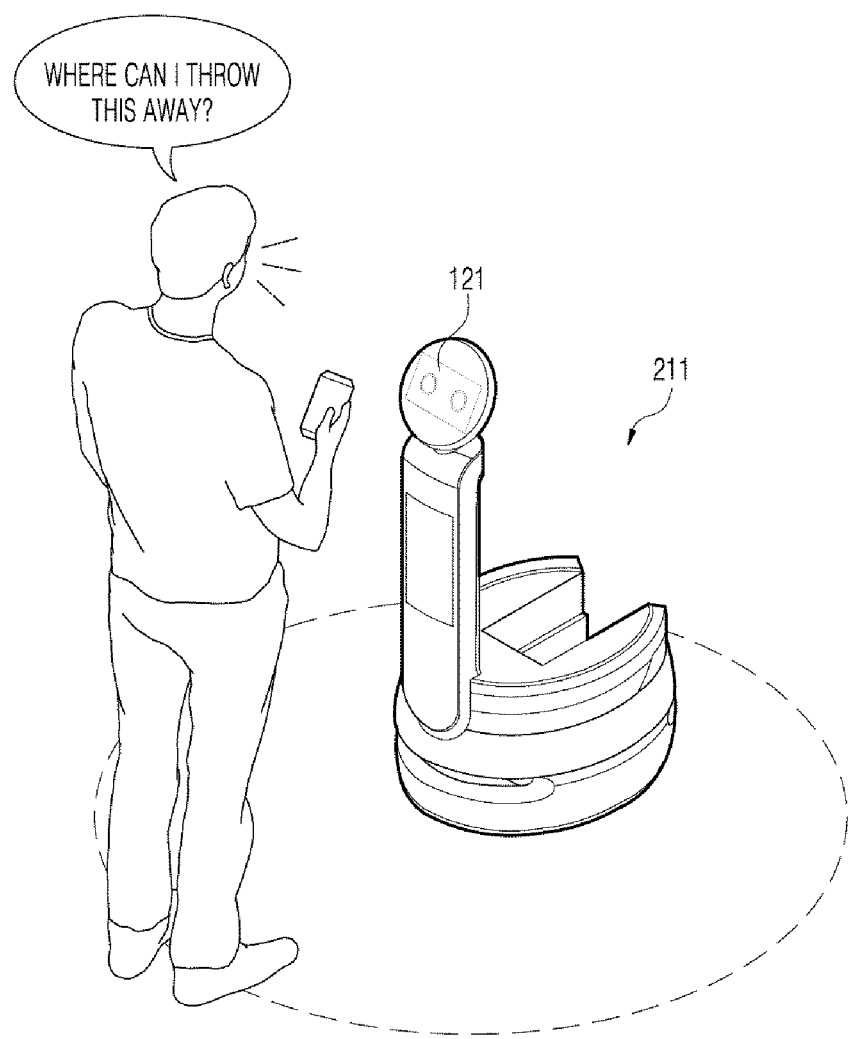
FIGS. 8A to 8C are exemplary diagrams illustrating a second communication robot, as an electronic device provided with an information processing apparatus according to an embodiment of the present disclosure, explaining an image capture region to be scanned according to a first demonstrative pronoun.
Figure 8B:
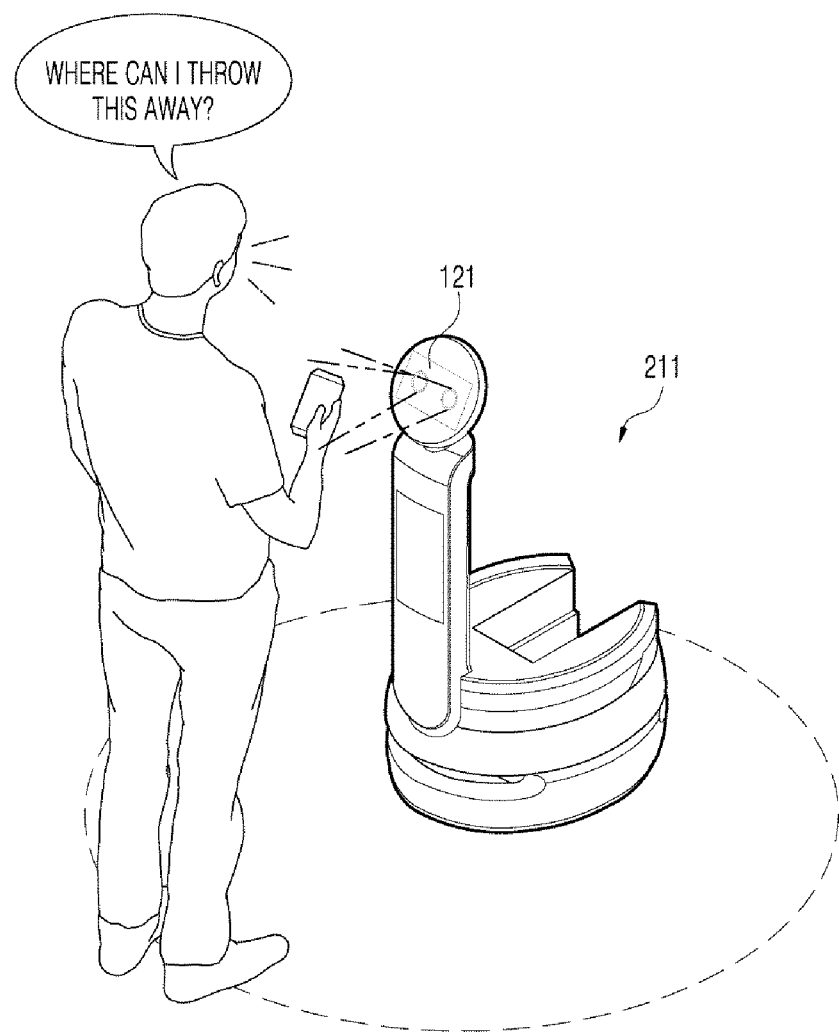
Figure 8C:
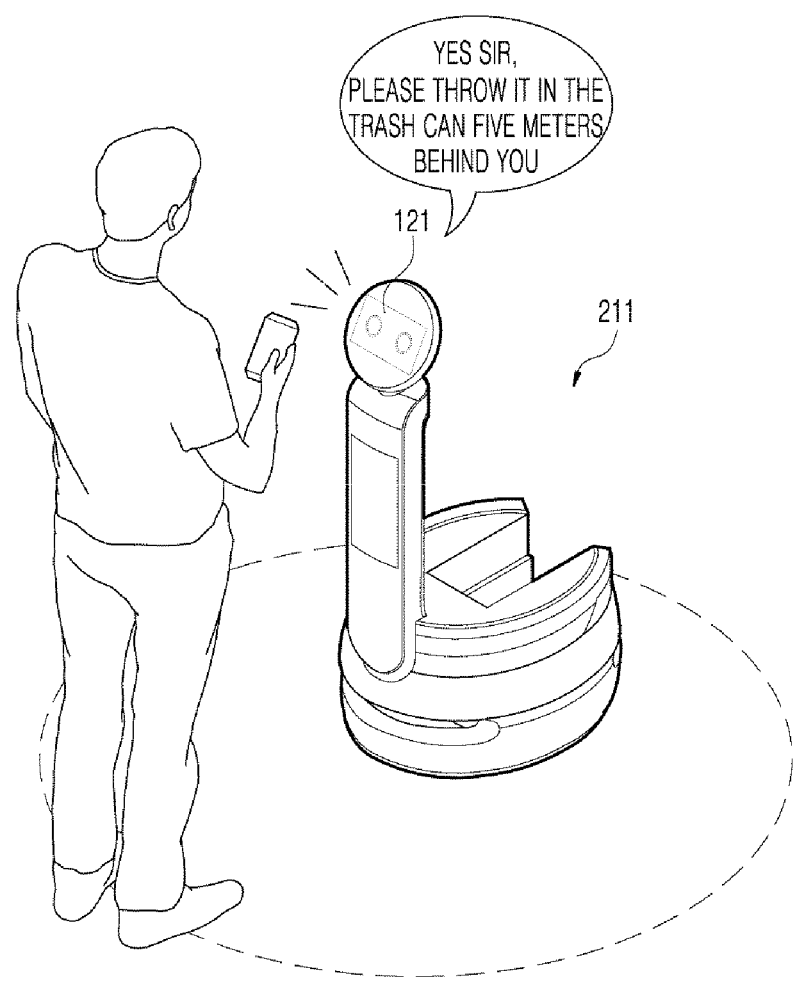

FIGS. 8A to 8C are exemplary diagrams illustrating a second communication robot, as an electronic device provided with an information processing apparatus according to the present embodiment, explaining an image capture region to be scanned according to a first demonstrative pronoun. Hereinafter, description overlapping with that of FIGS. 1 to 7 will be omitted.

Referring to FIG. 8A, the spoken utterance of "Where can I throw this away?" may be received, which is a spoken utterance of the user who has approached the second communication robot 211, which is the electronic device 200 provided with the information processing apparatus 100.

Referring to FIG. 8B, the second communication robot 211, as the electronic device 200 provided with the information processing apparatus 100, may convert the spoken utterance of the user into a text, and then may compare a demonstrative pronoun included in a result of converting the spoken utterance into a text with the reference demonstrative pronouns stored in the memory 150 to extract a first demonstrative pronoun 'this' as a matching demonstrative pronoun.

In response to extraction of the first demonstrative pronoun, the second communication robot 211 may determine a region between the user and the information processing apparatus 100 as the image capture region to be scanned by the camera 121, and may then scan the determined region.

Referring to FIG. 8C, the second communication robot 211, as the electronic device 200 provided with the information processing apparatus 100, may recognize a target indicated by the user from a result of scanning the image capture region, and may feed back, to the user, the spoken utterance of "Yes sir, please throw it in the trash can five meters behind you" as a result of processing the spoken utterance of the user on the basis of a result of the recognition.

Figure 9A:
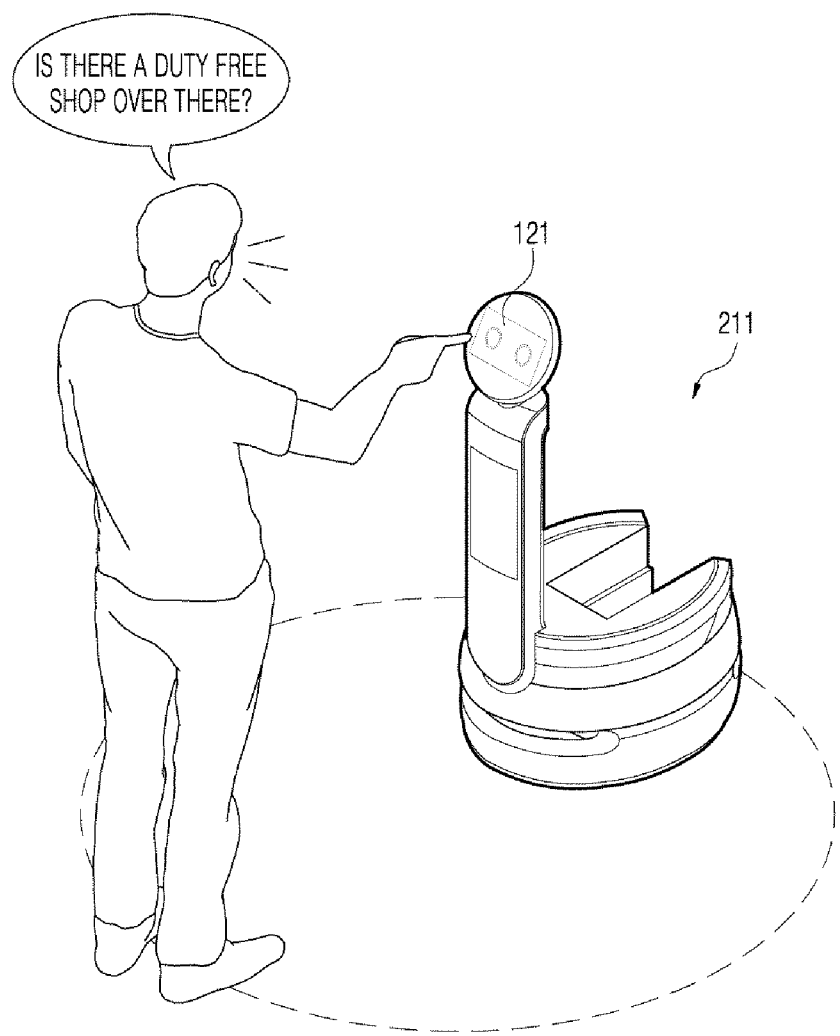
FIGS. 9A to 9C are exemplary diagrams illustrating a second communication robot, as an electronic device provided with an information processing apparatus according to an embodiment of the present disclosure, explaining an image capture region to be scanned according to a second demonstrative pronoun.
Figure 9B:
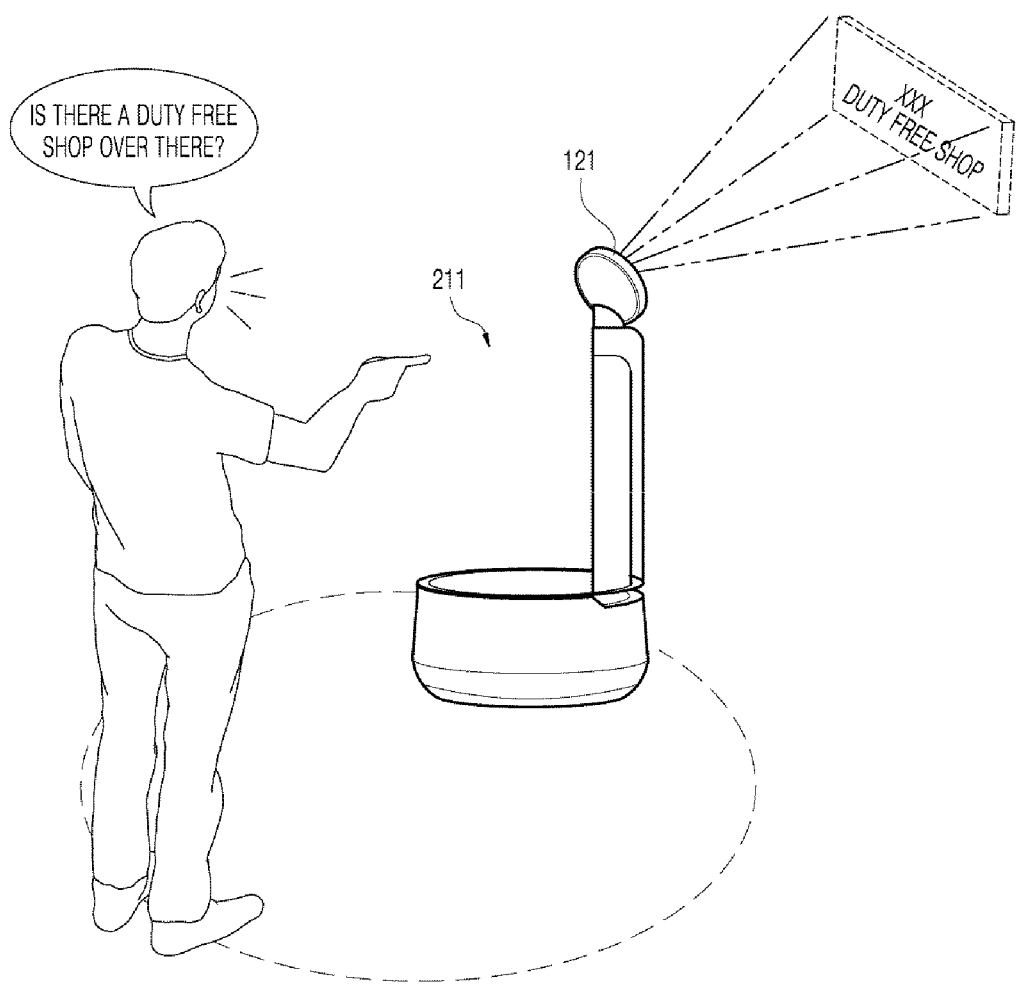
Figure 9C:
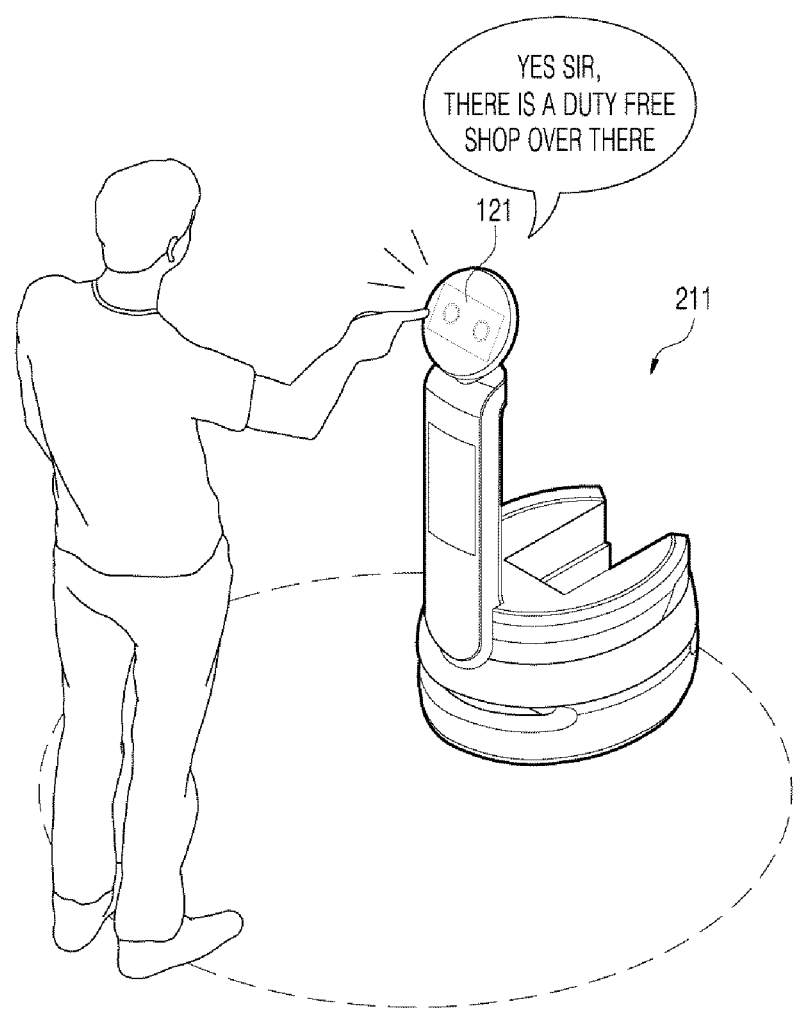

FIGS. 9A to 9C are exemplary diagrams illustrating a second communication robot, as an electronic device provided with an information processing apparatus according to the present embodiment, explaining an image capture region to be scanned according to a second demonstrative pronoun. Hereinafter, description overlapping with that of FIGS. 1 to 8 will be omitted.

Referring to FIG. 9A, the spoken utterance of "Is there a duty free shop over there?" may be received, which is a spoken utterance of the user who has approached the second communication robot 211, which is the electronic device 200 provided with the information processing apparatus 100.

Referring to FIG. 9B, the second communication robot 211, as the electronic device 200 provided with the information processing apparatus 100, may convert the spoken utterance of the user into a text, and then may compare a demonstrative pronoun included in a result of converting the spoken utterance into a text with the reference demonstrative pronouns stored in the memory 150 to extract a second demonstrative pronoun 'there' as a matching demonstrative pronoun.

Furthermore, upon receiving the spoken utterance, the second communication robot 211 may obtain image information including a gesture of the user to identify a direction indicated by the user.

In response to extraction of the second demonstrative pronoun, the second communication robot 211 as the electronic device 200 provided with the information processing apparatus 100 may determine an arbitrary region including the direction indicated by the user as the image capture region to be scanned by the camera 121, and may then scan the determined region.

Referring to FIG. 9C, the second communication robot 211, as the electronic device 200 provided with the information processing apparatus 100, recognizes a target indicated by the user from a result of scanning the image capture region, and feeds back, to the user, the spoken utterance which reads "Yes sir, there is a duty free shop over there" as a result of processing the spoken utterance of the user on the basis of a result of the recognition.

Figure 10:
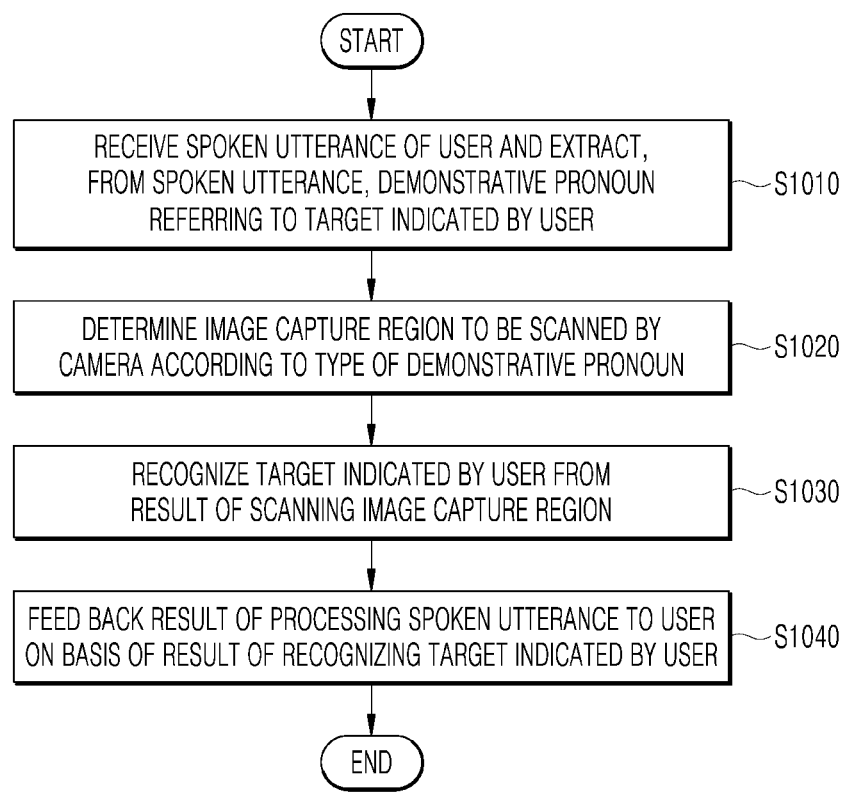
FIG. 10 a flowchart illustrating an information processing method according to an embodiment of the present disclosure.

FIG. 10 a flowchart illustrating an information processing method according to the present embodiment. Hereinafter, description overlapping with that of FIGS. 1 to 9 will be omitted.

Referring to FIG. 10, in operation S1010, the information processing apparatus 100 receives a spoken utterance of the user, and extracts, from the spoken utterance, a demonstrative pronoun referring to a target indicated by the user.

The information processing apparatus 100 may convert the received spoken utterance of the user into a text. In an alternative embodiment, upon receiving the spoken utterance, the information processing apparatus 100 may obtain image information including a gesture of the user to identify a direction indicated by the user. The information processing apparatus 100 may obtain skeleton information from the gesture of the user included in the image information, and may identify the direction indicated by the user using a position of shoulder joints and a position of knuckles of the user from the skeleton information. Furthermore, the information processing apparatus 100 may identify the direction indicated by the user included in the image information using a deep neural network model trained in advance to identify a direction indicated by an object by analyzing a gesture of the object included in image information. The information processing apparatus 100 may compare demonstrative pronouns included in the result of converting the spoken utterance of the user into a text with the reference demonstrative pronouns stored in the memory 150 so as to extract a matching demonstrative pronoun.

In operation S1020, the information processing apparatus 100 determines an image capture region to be scanned by the camera 121 according to the type of the demonstrative pronoun. In an alternative embodiment, the information processing apparatus 100 may determine an image capture region to be scanned by the camera 121 provided in the information processing apparatus 100 according to at least one of the type of a demonstrative pronoun or the result of identifying the direction indicated by the user.

When the type of the extracted demonstrative pronoun is the first demonstrative pronoun, the information processing apparatus 100 may determine a region between the user and the information processing apparatus 100 as the image capture region to be scanned by the camera 121. When the type of the extracted demonstrative pronoun is the second demonstrative pronoun, the information processing apparatus 100 may determine which region among regions located in the direction indicated by the user should be the image capture region to be scanned by the camera 121.

Here, a method of determining the image capture region to be scanned may vary according to the type of the camera 121. For example, when the camera 121 is the first camera 121a, and the type of the extracted demonstrative pronoun is the first demonstrative pronoun, the information processing apparatus 100 may move the optical lens 121a_1 to the first position 121a_11 to determine the image capture region to be scanned by the camera 121a so that an image of a region between the user and the image processing apparatus 100, that is, the first-angle-of-view image 121a_21, is outputted to the image sensor 121a_2. Furthermore, when the type of the extracted demonstrative pronoun is the second demonstrative pronoun, the information processing apparatus 100 may move the optical lens 121a_1 to the second position 121a_12 to determine the image capture region to be scanned by the camera 121a so that an image of a peripheral region of the direction indicated by the user, that is, the second-angle-of-view image 121a_22, is outputted to the image sensor 121a_2.

As another example, when the camera 121 is the second camera 121b, and the type of the extracted demonstrative pronoun is the first demonstrative pronoun, the information processing apparatus 100 may select a wide-angle lens (121b_1 of FIG. 5B) to determine a region between the user and the information processing apparatus 100 as the image capture region to be scanned by the second camera 121b. Furthermore, when the type of the extracted demonstrative pronoun is the second demonstrative pronoun, the information processing apparatus 100 may select a telescopic lens (121b_3 of FIG. 7B) to determine an arbitrary region including the direction indicated by the user as the image capture region to be scanned by the second camera 121b.

As another example, when the camera 121 is the third camera 121c, and the type of the extracted demonstrative pronoun is the first demonstrative pronoun, the information processing apparatus 100 may decrease the intensity of the output light outputted from the light source 121c_1 to a value lower than a reference value to determine a region between the user and the information processing apparatus 100 as the image capture region to be scanned by the third camera 121c. Furthermore, when the type of the extracted demonstrative pronoun is the second demonstrative pronoun, the information processing apparatus 100 may increase the intensity of the output light outputted from the light source 121c_1 to a value higher than the reference value to determine an arbitrary region including the direction indicated by the user as the image capture region to be scanned by the third camera 121c.

In operation S1030, after determining the image capture region to be scanned by the camera 121, the information processing apparatus 100 recognizes the target indicated by the user from a result of scanning the image capture region. The information processing apparatus 100 may recognize what the target indicated by the user is by extracting a feature point from the result of scanning the image capture region.

In operation S1040, the information processing apparatus 100 feeds back a spoken utterance processing result to the user on the basis of a result of recognizing the target indicated by the user. When it is impossible to recognize the target indicated by the user from the result of scanning the image capture region, the information processing apparatus 100 may give an additional query (for example, asking what is indicated by a demonstrative pronoun) to the user, and then may process a spoken utterance, and may feed back a spoken utterance processing result to the user.

The above-described embodiments of the present disclosure can be implemented as a computer program that can be executed on a computer using various components, and the computer program can be stored in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (particularly in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. An information processing method performed by an information processing apparatus, the information processing method comprising:
receiving a spoken utterance of a user and extracting, from the spoken utterance, a demonstrative pronoun referring to a target indicated by the user;
determining an image capture region to be scanned by a camera according to a type of the demonstrative pronoun;
recognizing the target indicated by the user from a result of scanning the image capture region; and
feeding back, to the user, a result of processing the spoken utterance based on a result of recognizing the target indicated by the user,
wherein the determining the image capture region comprises selecting a wide-angle lens of a triple camera provided in the information processing apparatus and having the wide-angle lens, a normal lens, and a telescopic lens to determine a region between the user and the information processing apparatus as the image capture region to be scanned, in response to the extracted demonstrative pronoun being a first demonstrative pronoun referring to a target located near the user.

2. The information processing method of claim 1, wherein the determining the image capture region comprises determining the region between the user and the information processing apparatus by adjusting an intensity of output light outputted from a time-of-flight (TOF) camera provided in the information processing apparatus as the image capture region to be scanned by the camera, in response to the extracted demonstrative pronoun being the first demonstrative pronoun referring to the target located near the user.

3. The information processing method of claim 1, further comprising identifying a direction indicated by the user by obtaining image information comprising a gesture of the user upon receiving the spoken utterance, and
wherein the determining the image capture region comprises determining which region among regions located in the direction indicated by the user is to be the image capture region to be scanned by the camera, according to the type of the demonstrative pronoun.

4. The information processing method of claim 3, wherein the identifying the direction indicated by the user comprises:
obtaining skeleton information from the gesture of the user included in the image information; and
identifying the direction indicated by the user using a position of shoulder joints and a position of knuckles of the user from the skeleton information.

5. The information processing method of claim 3, wherein the identifying the direction indicated by the user comprises identifying the direction indicated by the user included in the image information using a deep neural network model trained in advance to identify a direction indicated by an object by analyzing a gesture of the object included in image information.

6. The information processing method of claim 3, wherein the determining the image capture region comprises determining which region among the regions located in the direction indicated by the user is to be the image capture region to be scanned by the camera, in response to the extracted demonstrative pronoun being a second demonstrative pronoun referring to a target located far away from the user and the information processing apparatus.

7. The information processing method of claim 3, wherein the determining the image capture region comprises selecting the telescopic lens of the triple camera provided in the information processing apparatus to determine a peripheral region of the direction indicated by the user as the image capture region to be scanned, in response to the extracted demonstrative pronoun being a second demonstrative pronoun referring to a target located far away from the user and the information processing apparatus.

8. The information processing method of claim 3, wherein the determining the image capture region comprises increasing an intensity of output light outputted from a time-of-flight (TOF) camera provided in the information processing apparatus to a value higher than a reference value to determine a peripheral region of the direction indicated by the user as the image capture region to be scanned, in response to the extracted demonstrative pronoun being a second demonstrative pronoun referring to a target located far away from the user and the information processing apparatus.

9. An information processing method performed by an information processing apparatus, the information processing method comprising:
receiving a spoken utterance of a user and extracting, from the spoken utterance, a demonstrative pronoun referring to a target indicated by the user;
determining an image capture region to be scanned by a camera according to a type of the demonstrative pronoun;
recognizing the target indicated by the user from a result of scanning the image capture region; and
feeding back, to the user, a result of processing the spoken utterance based on a result of recognizing the target indicated by the user,
wherein the determining the image capture region comprises decreasing an intensity of output light outputted from a time-of-flight (TOF) camera provided in the information processing apparatus to a value lower than a reference value to determine a region between the user and the information processing apparatus as the image capture region to be scanned, in response to the extracted demonstrative pronoun being a first demonstrative pronoun referring to a target located near the user.

10. An information processing apparatus comprising:
an extraction processor configured to receive a spoken utterance of a user and extract, from the spoken utterance, a demonstrative pronoun referring to a target indicated by the user;
a determination processor configured to determine an image capture region to be scanned by a camera according to a type of the demonstrative pronoun;
a recognition processor configured to recognize the target indicated by the user from a result of scanning the image capture region; and
a feedback processor configured to feed back, to the user, a result of processing the spoken utterance based on a result of recognizing the target indicated by the user,
wherein the determination processor is configured to select a wide-angle lens of a triple camera provided in the information processing apparatus and having the wide-angle lens, a normal lens, and a telescopic lens to determine a region between the user and the information processing apparatus as the image capture region to be scanned, in response to the extracted demonstrative pronoun being a first demonstrative pronoun referring to a target located near the user.

11. The information processing apparatus of claim 10, wherein the determination processor is configured to determine the region between the user and the information processing apparatus by adjusting an intensity of output light outputted from a time-of-flight (TOF) camera provided in the information processing apparatus as the image capture region to be scanned by the camera, in response to the extracted demonstrative pronoun being the first demonstrative pronoun referring to the target located near the user.

12. The information processing apparatus of claim 10, wherein the determination processor is configured to decrease an intensity of output light outputted from a time-of-flight (TOF) camera provided in the information processing apparatus to a value lower than a reference value to determine a region between the user and the information processing apparatus as the image capture region to be scanned, in response to the extracted demonstrative pronoun being the first demonstrative pronoun referring to the target located near the user.

13. The information processing apparatus of claim 10, further comprising an analysis processor configured to identify a direction indicated by the user by obtaining image information comprising a gesture of the user, upon receiving the spoken utterance, and
wherein the determination processor is configured to determine which region among regions located in the direction indicated by the user is to be the image capture region to be scanned by the camera, according to the type of the demonstrative pronoun.

14. The information processing apparatus of claim 13, wherein the analysis processor is configured to obtain skeleton information from the gesture of the user included in the image information, and identify the direction indicated by the user using a position of shoulder joints and a position of knuckles of the user from the skeleton information.

15. The information processing apparatus of claim 13, wherein the analysis processor is configured to identify the direction indicated by the user included in the image information using a deep neural network model trained in advance to identify a direction indicated by an object by analyzing a gesture of the object included in image information.

16. The information processing apparatus of claim 13, wherein the determination processor is configured to determine which region among the regions located in the direction indicated by the user is to be the image capture region to be scanned by the camera, in response to the extracted demonstrative pronoun being a second demonstrative pronoun referring to a target located far away from the user and the information processing apparatus.

17. The information processing apparatus of claim 13, wherein the determination processor is configured to select the telescopic lens of the triple camera provided in the information processing apparatus to determine a peripheral region of the direction indicated by the user as the image capture region to be scanned, in response to the extracted demonstrative pronoun being a second demonstrative pronoun referring to a target located far away from the user and the information processing apparatus.

18. The information processing apparatus of claim 13, wherein the determination processor is configured to increase an intensity of output light outputted from a time-of-flight (TOF) camera provided in the information processing apparatus to a value higher than a reference value to determine a peripheral region of the direction indicated by the user as the image capture region to be scanned, in response to the extracted demonstrative pronoun being a second demonstrative pronoun referring to a target located far away from the user and the information processing apparatus.

* * * * *

UNITED STATES PATENT AND TRADEMARK OFFICE
CERTIFICATE OF CORRECTION

| | |
|---|---|
| PATENT NO. | : 11,445,120 B2 |
| APPLICATION NO. | : 16/787905 |
| DATED | : September 13, 2022 |
| INVENTOR(S) | : In Jung Yang et al. |

It is certified that error appears in the above-identified patent and that said Letters Patent is hereby corrected as shown below:

On the Title Page

Item (54) and in the Specification, Column 1, Lines 1-4:
The title reading "INFORMATION PROCESSING METHOD FOR ADJUSTTING AN IMAGE CAPTURE REGION BASED ON SPOKEN UTTERANCE AND APPARATUS THEREFOR"
Should read:
-- INFORMATION PROCESSING METHOD FOR ADJUSTING AN IMAGE CAPTURE REGION BASED ON SPOKEN UTTERANCE AND APPARATUS THEREFOR --

Signed and Sealed this
Sixth Day of December, 2022

Katherine Kelly Vidal
*Director of the United States Patent and Trademark Office*